Dec. 23, 1952 N. E. BROOKE 2,622,387
BROOM RAKE
Filed Nov. 4, 1947 5 Sheets-Sheet 1
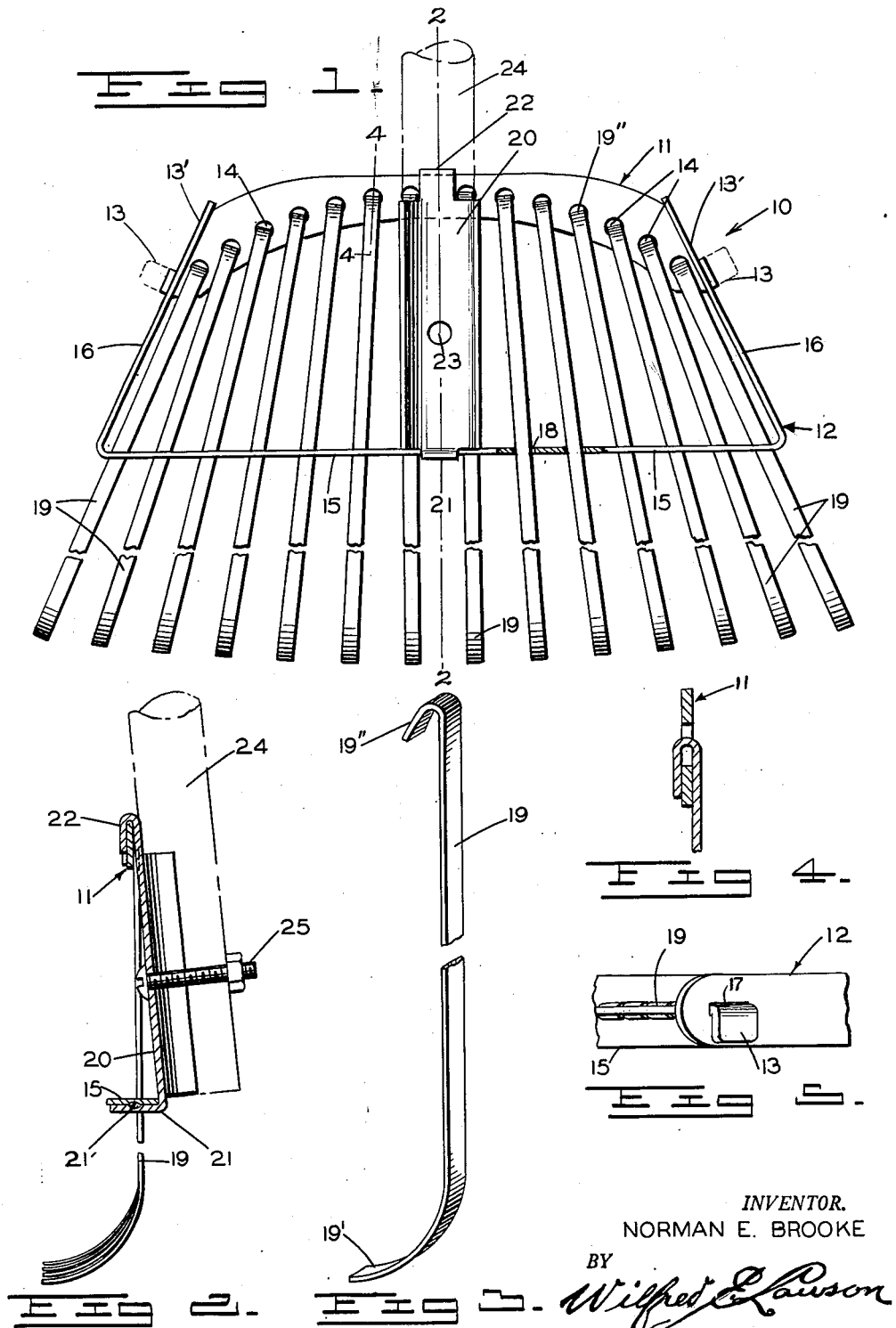
INVENTOR.
NORMAN E. BROOKE
BY Wilfred E. Lawson
ATTORNEY

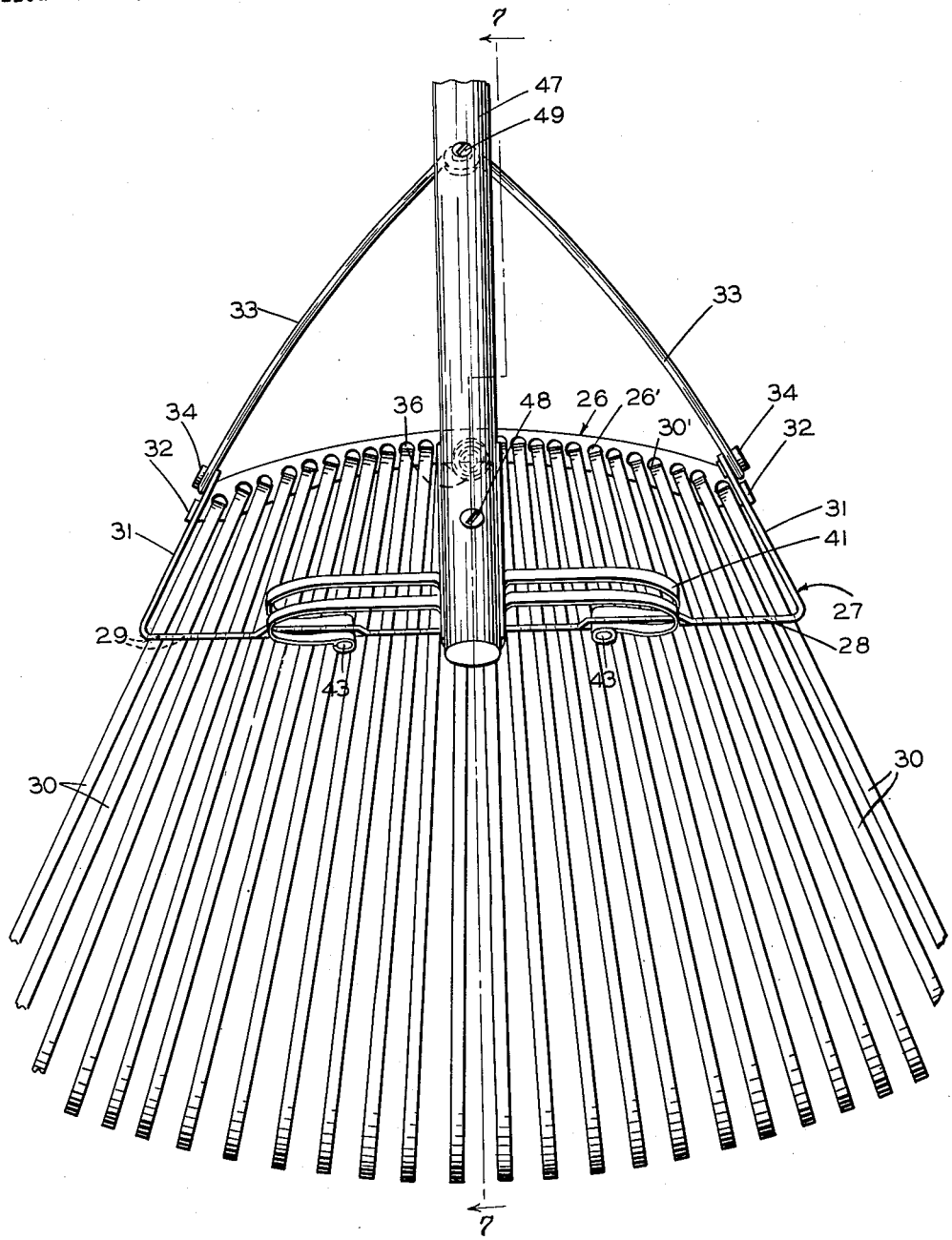

Dec. 23, 1952 N. E. BROOKE 2,622,387
BROOM RAKE
Filed Nov. 4, 1947 5 Sheets-Sheet 3
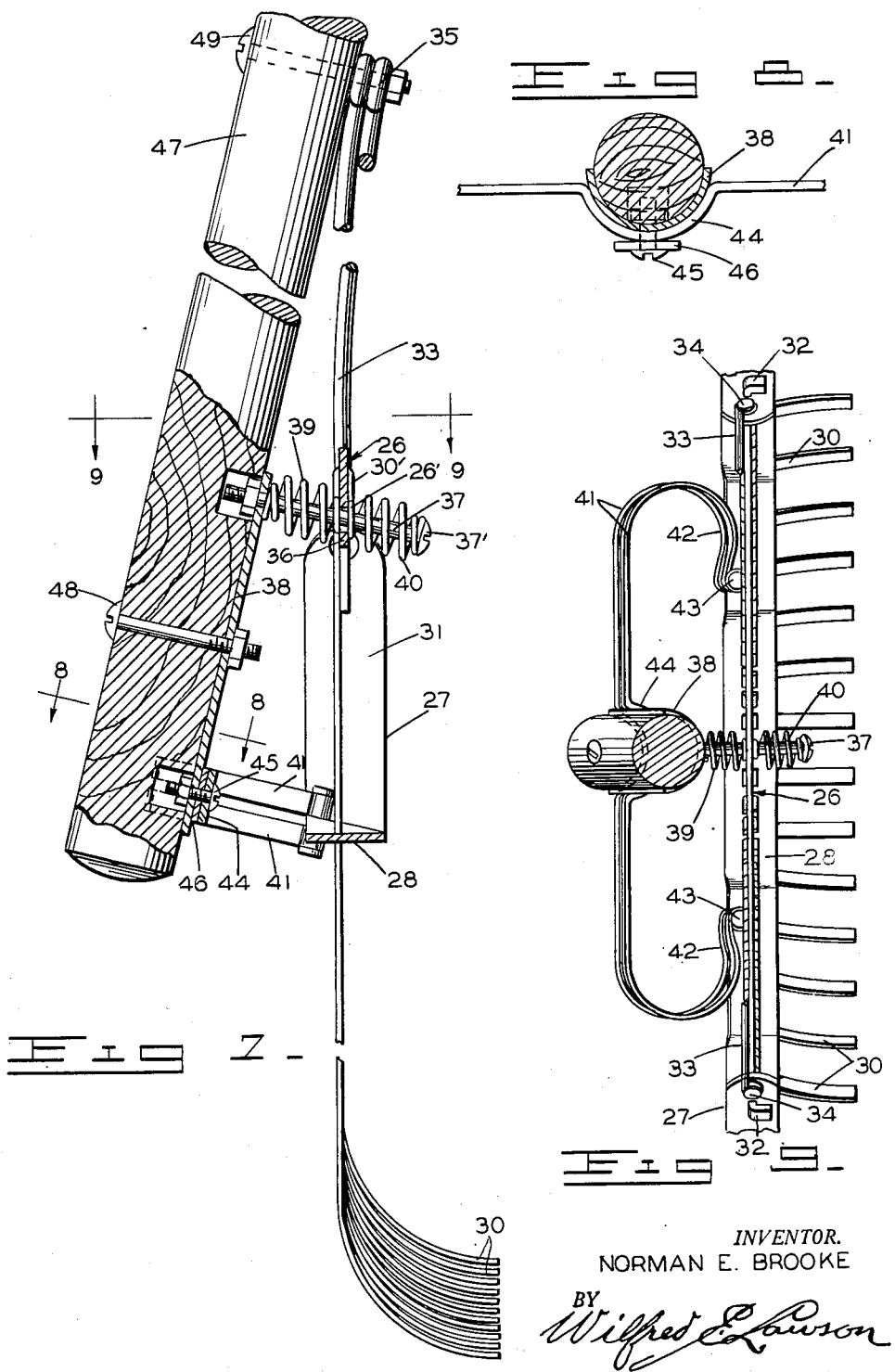
INVENTOR.
NORMAN E. BROOKE
BY Wilfred E. Lawson
ATTORNEY Dec. 23, 1952 N. E. BROOKE 2,622,387
BROOM RAKE
Filed Nov. 4, 1947 5 Sheets-Sheet 4
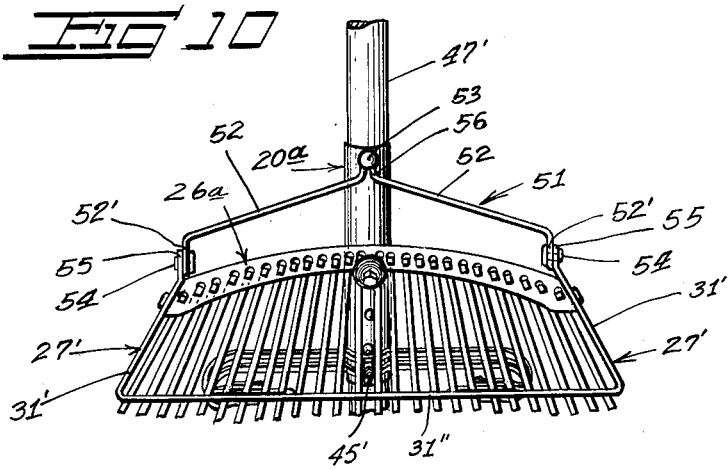
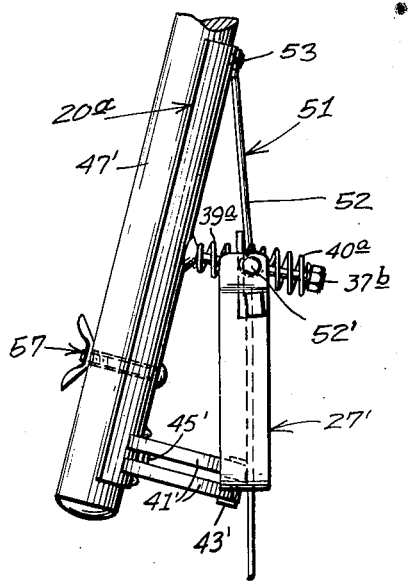
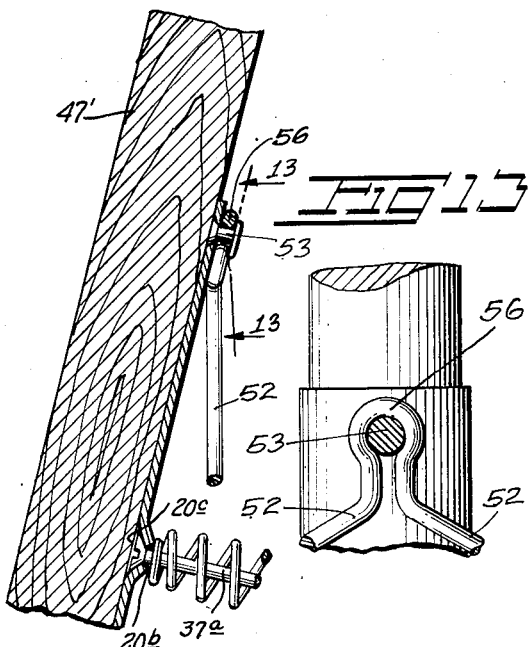
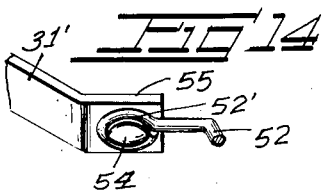
INVENTOR.
Norman E. Brooke
BY
Wilfred Lawson
Attorney

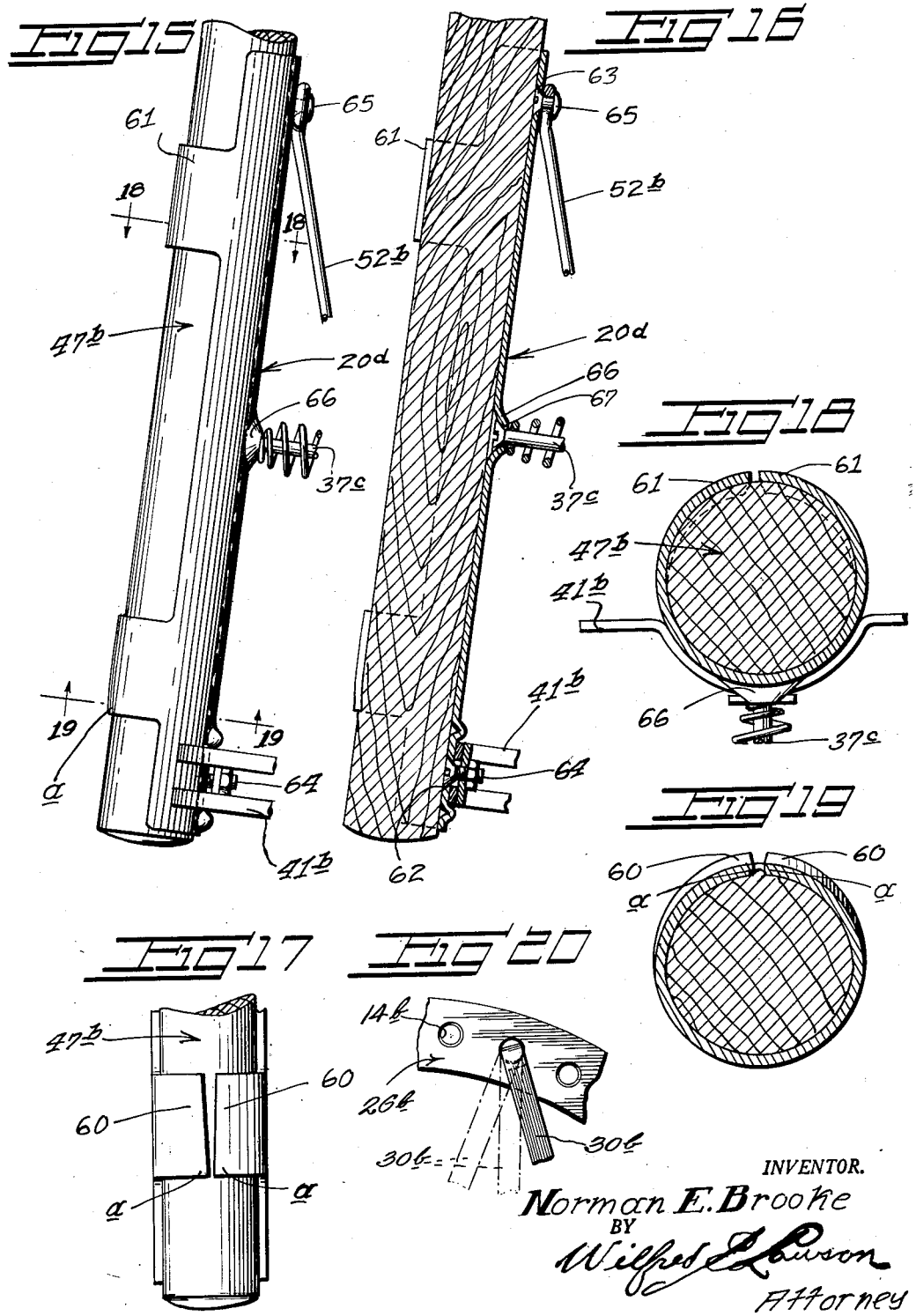

Patented Dec. 23, 1952

2,622,387

UNITED STATES PATENT OFFICE 2,622,387

BROOM RAKE

Norman E. Brooke, Washington, D. C.

Application November 4, 1947, Serial No. 784,007

10 Claims. (Cl. 56—400.17)

This invention relates generally to the class of rakes and is directed particularly to improvements in hand rakes of the so called broom type.

A particular object of the present invention is to provide a rake of the type stated wherein the assembling of the tines or rake fingers may be accomplished easily and quickly without the necessity of having to use a jig or any other type of holding or supporting means.

Another object of the invention is to provide a rake structure of the type described employing a yoke or back bar in association with a forwardly positioned bridle bar, with means for assembling the rake fingers or tines with respect to the yoke and bridle bars in such a manner that such assembling can be easily and quickly accomplished while holding such bars in the hand and the tines or rake fingers may be positively locked or secured to the yoke bar without the employment of separate attaching elements.

Still another object of the invention is to provide a rake structure of the character stated which is designed in a novel manner whereby certain of the elements may be readily folded into a position which facilitates the packing of a number of the rakes, with handles detached, into a compact assemblage for shipping.

A still further object of the invention is to provide a rake structure of the character stated wherein the rake head is yieldingly coupled with the handle in a novel manner to form a knee action between the handle and rake head whereby the rake may be used with a minimum of effort.

Still another object of the invention is to provide a rake structure of the character stated having a novel means for coupling a handle with the head wherein the centering or positioning of the handle for attachment to the head by the use of a single securing element may be accomplished with the utmost facility.

Another object of the invention is to provide in a rake structure of the character stated a head structure wherein novel means is provided for coupling together the bridle and yoke bars which support the rake tines or fingers.

The invention will be best understood from a consideration of the following detailed description taken in connection with the accompanying drawings forming a part of the specification, with the understanding, however, that the invention is not to be understood as limited to the exact details of construction shown and described since obvious modifications will occur to a person skilled in the art.

In the drawings:

Figure 1 is a view in plan of a rake head constructed in accordance with one embodiment of the present invention, parts being in section and the handle being shown in broken outline.

Figure 2 is a longitudinal section taken substantially on the line 2—2 of Figure 1, the figure having added thereto the handle securing screw.

Figure 3 is an enlarged detail perspective view of a tine as formed preparatory to its assembly in the rake head.

Figure 4 is a detail section taken substantially on the line 4—4 of Figure 1 showing the frictional connection between the tine and the yoke bar.

Figure 5 is an enlarged fragmentary detail illustrating the connection between an end of the yoke bar and the bridle bar.

Figure 6 is a view in plan of the back or top side of a second embodiment of the present invention.

Figure 7 is an enlarged sectional view taken substantially on the line 7—7 of Figure 6.

Figure 8 is a sectional view taken substantially on the line 8—8 of Figure 7.

Figure 9 is a sectional view taken substantially on the line 9—9 of Figure 7.

Figure 10 is a plan view of the underside of another embodiment of the invention showing a modified form of the saddle plate to which the handle is attached and a modified arrangement of the brace rod extending laterally therefrom, the forward end of the tines being broken off.

Figure 11 is a view in side elevation of the modified saddle construction illustrated in Figure 10.

Figure 12 is a longitudinal section on an enlarged scale of the upper end of the saddle shown in Figure 11 and the adjacent portion of the handle, the plane of section being perpendicular to the line of sight of Figure 11.

Figure 13 is a sectional view on an enlarged scale taken on the line 13—13 of Figure 12.

Figure 14 is a detailed perspective showing the connection between an end of a brace arm and an end of the yoke bar.

Figure 15 is a view in side elevation of still another form or embodiment of the handle receiving saddle.

Figure 16 is a longitudinal section through the modified construction of saddle and through the forward end of the handle, shown in Figure 15, the plane of section being perpendicular to the line of sight of Figure 15.

Figure 17 is a view in elevation of the top side of the lower end portion of the structure illustrated in Figure 15.

Figure 18 is an enlarged transverse section taken substantially on the line 18—18 of Figure 15.

Figure 19 is an enlarged transverse section taken substantially on the line 19—19 of Figure 15.

Figure 20 is a detail illustrating the flexibility between the yoke bar and a tine.

Referring to Figures 1 to 5 of the drawings wherein is illustrated one embodiment of the present rake construction, the numeral 10 generally designates the rake head which comprises the yoke or back bar 11 and the bridle bar 12.

The yoke bar 11 is in the form of an arcuate flat metal body having the substantially right angularly directed securing ears 13 at its two ends, which ears are directed laterally rearwardly in the initial assemblage of the structure, the yoke bar being disposed with the arch directed rearwardly as illustrated. This yoke bar is provided with a plurality of apertures 14 which extend throughout the extent of the bar between the ears 13 and each of which receives an end of a tine, as hereinafter described.

The bridle bar 12 comprises the forwardly positioned bar portion 15 which extends transversely of the head structure and is disposed at a prescribed distance forwardly of the concave edge of the yoke bar and the rearwardly directed and convergent side portions or arms 16, each of which has a slot 17 adjacent to its rear end to receive an ear 13 of the yoke bar. In the completed head structure the ears 13 are bent down as illustrated in Figure 5 so as to lock together the ends of the arms 16 and the ends of the yoke bar.

The bridle bar is formed of flat band or ribbon like metal and the transverse central portion 15 thereof is provided with slots 18 corresponding in number with the apertures or holes 14 in the yoke bar, for the extension therethrough of the rake tines or fingers 19.

The tines 19 are of flat strip metal and each is formed at its forward end with the relatively long curved terminal portion 19' and at its rearward end it is temporarily formed with the open hook 19''. This hook end 19'' is adapted to be extended through an opening 14 of the yoke bar, the portion of the tine between the ends thereof being extended through a slot 18 of the middle portion 15 of the bridle bar in the manner illustrated.

After all of the tines have been extended through the slots 18 of the bridle bar and the hooks 19'' have been engaged in their respective openings 14 of the yoke bar, pressure is applied by a suitable press to the hook ends 19'' and the yoke bar with which they are connected, for the purpose of mashing or closing the hooks into gripping relation with the yoke bar as illustrated in Figure 4. Thus each tine is firmly coupled with the yoke bar without the use of coupling or attaching elements.

At the longitudinal center of the rake head structure is positioned the long saddle plate 20 which is of transversely arcuate form and has the forward and rear tongues 21 and 22 respectively. This saddle plate 20 bridges the space between the center portion of the bridle bar and the yoke bar and the rear tongue 22 is positioned across the rear edge of the yoke bar and bent upwardly against the underside thereof while the forward tongue 21 is turned down against the forward face of the portion 15 of the bridle bar to which it is welded or otherwise suitably secured.

The saddle plate 20 has a single aperture 23 midway of its ends and the plate receives the forward end of the rake handle 24 which is provided with a suitable opening for the extension therethrough and through the opening 23 of a securing bolt 25.

It is believed that it will be readily apparent that in assembling the parts of the rake structure the yoke bar is positioned between the rear ends of the arms 16 of the bridle bar and the ears 13 are extended through the slots 17 of the arms and then bent over to clamp the end of each arm between the bent over portion of the ear and the adjacent shoulder part 13'. This shoulder part is at the proper angle to substantially parallel the adjacent arm and the ear 13 is substantially perpendicular to the shoulder 13'. In this manner a firm joint is established between the arms and the ends of the yoke bar. The saddle plate 20 may then be placed in position and secured by welding at the point 21' after bending the terminal portion 22 into clamping relation with the yoke bar as illustrated.

By then holding the frame thus produced by the assemblage of the yoke and bridle bars in one hand the tines may be easily and quickly placed in position by first running the curved forward end portion 19' through a slot 18 of the bridle bar and bringing the hook 19'' into position for engagement in the proper opening 14. After all of the tines have thus been placed in position the hooks 19'' are bent or pressed flat in the manner shown in Figure 4 so as to bring them into gripping relation with the yoke bar in the manner shown and as previously stated. The attachment of the handle 24 may then be accomplished in an obvious manner.

Figures 6 to 9 illustrate a second form or embodiment of the invention wherein a yieldable or resilient coupling is provided between the rake head and the rake handle to provide for freer action of the parts.

In this second embodiment the same coupling is employed between the yoke and bridle bars and the tines are connected with the yoke bar in the same manner as in the first described form and accordingly these features will only be referred to generally.

In the second embodiment the yoke bar is generally designated 26 and the bridle bar is generally designated 27, the intermediate or central portion of the bridle bar, designated 28, having therein the slots 29 for the reception of the rake tines 30.

The rearwardly converging side arms 31 of the bridle bar receive the attaching ears 32 at a point somewhat further inwardly from the end of the arm than in the first described form whereby there may be attached to the arm between the ear 32 and the end of the arm, an end of a tie rod 33. As shown the tie rod 33, which is attached to each arm, is so attached by means of a rivet 34 so that the tie rod 33 can be swung forwardly on the rivet to lie against and in parallel relation with the outer side of the arm 31 to facilitate packing the rake head in a suitable receptacle or carton. The rear or free ends of the brace rods 33 are provided with terminal eyes 35 to facilitate the connection of the rods with the rake handle as hereinafter described.

The yoke bar 26, which is provided with openings 26' to receive the hooked ends 30' of the rake tines, is formed midway between its ends and upon the concave forward edge, with the forwardly projecting ear 36 which is apertured to receive a spring guide bolt 37. The upper end of this bolt passes through a suitable aperture in the rear portion of the transversely arcuate handle receiving saddle plate 38 and surrounding the bolt 37 above and below the yoke bar 26 are the springs 39 and 40 one of which, here shown as the spring 39, is positioned between the underside of the handle receiving saddle 38 and the yoke bar 26, while the other spring, here designated 40, is held between the underside of the yoke bar 26 and the head 37' of the bolt 37. These springs function as shock absorbers and as centering or positioning springs to yieldingly maintain the saddle 38 and the yoke bar 26 in a prescribed working relation.

Cooperating with the springs 39 and 40, which are at the rear of the head unit, are front springs 41 which are of the leaf type and extend transversely of the head above the central portion 28 of the bridle bar. These leaf springs are of substantial length and lie in side by side relation as shown and each has a downwardly and inwardly turned under portion 42 which is mounted with the corresponding adjacent portion of the other spring, upon a screw or bolt 43 which is passed through the central portion 28 of the bridle bar. The said central portion of the bridle bar is thus disposed between the adjacent under turned portions 42 of the springs and the main body portion of each spring is disposed at an elevation above the central part of the bridle bar.

Midway between their ends the springs 41 are depressed to provide the pocket portion 44 and in these pocket portions of the two springs 41 rests the forward end portion of the handle receiving saddle 38 which is secured to the springs 41 by the bolt or screw 45. A plate or washer 46 is interposed between the head of the screw 45 and the undersides of the springs as illustrated in Figure 7, whereby to provide firm contact or connection between the springs and the screw head.

The numeral 47 designates the rake handle, the forward end of which lies in the saddle plate 38 to which it is secured by a single bolt or screw 48 which passes through the handle and through an opening in the saddle plate in the same manner as the handle 24 is secured to the saddle plate 20 the first described embodiment.

Rearwardly of the yoke bar 26, the handle 47 is provided with a suitable opening to receive a bolt 49 which passes through the eyes 35 of the two brace rods 33 which are disposed one upon the other against the underside of the handle.

In the construction of the second embodiment it will be readily apparent that for convenience in shipping a number of rake heads removed from the handles, the brace rods 30 may be swung forwardly as previously explained to a position parallel with the adjacent arms 31 thereby making it possible to stack a number of the rake heads for convenient placement in a carton or shipping receptacle.

It is to be stated that in the production of the rake constructed in accordance with either of the embodiments herein disclosed, the outer end portions of the tines or fingers 19, or 30, are initially straight, whereby the operator may more readily insert said fingers or tines through the openings of the yoke bar. After the tines 19, or 30, have been assembled, the outer portions thereof, by a suitable pressing action, are given a desired curvature as shown in the accompanying drawings.

Instead of the arangement shown in Figures 6 and 7 particularly, wherein a short saddle plate 38 is made use of and separate tie rods 33 are joined directly to the handle 47, the arrangement illustrated in Figure 10 of the drawings may be made use of. This arrangement has certain advantages over the arrangement shown in Figures 6 and 7 in that it avoids the necessity of having to drill a second hole through the rake handle and it also allows for a somewhat freer movement or play of the rake head.

In the modified construction shown in Figures 10 to 13 the handle receiving saddle which is here generally designated 20a is of materially greater length than the saddle 20 and at its rear end it carries the rivet stud 53.

In place of the separate tie rods 33 there is employed a single length of wire material of suitable gauge and rigidity which is generally designated 51 and which is formed to provide the tie rods 52. The outer extremities of the wire 51 are formed to provide the eyes 52' to facilitate the attachment of such extremities to the ends of the arms 31' of the bridle bar 27', by means of the bolts or rivets 54. To facilitate this attachment and provide for the desired additional flexibility or freedom of movement for the rake head, the side portions 31' of the bar 27' are extended rearwardly beyond the ends of the yoke bar 26a and are then bent outwardly to form the short straight terminal portions 55 which parallel the handle 47'. The free ends of the wire 51, where the eyes 52' are formed, are also bent to bring them into parallel relation with the portions 55 of the bridle bar as shown so that the rivets or bolts 54 are in alignment transversely of the rake head and in a line perpendicular to the length of the rake structure.

The wire body 51 is formed at the inner or meeting ends of the rods 52 to provide a loop or eye 56 through which the rivet stud 53 is extended.

With the modified arrangement just described it will be seen that since the rods 52 extend laterally from the rake handle 47' on lines more nearly approaching the perpendicular with respect to the handle, than do the rods 33, when pressure is applied to the rake head through the handle 47' the head will be permitted a slight turning movement on the axes of the bolts or rivets 54 whereas in the structure where the brace rods extend farther to the rear the swinging action would not be permitted to the same extent.

It will also be readily apparent that with this arrangement wherein the rods 52 are formed of a single piece of material the assembling of the rake head unit and the handle may be more readily accomplished since only a single securing nut and bolt unit is required as shown in Figure 11 and indicated generally by the reference character 57.

In this use of the longer saddle 20a it is contemplated that the loop or eye 56 will be secured by means of the rivet 53 when the head is assembled at the factory. Thus the brace arms 52 will come to the consumer already secured in place against the upper end of the saddle 20a whereas in the construction illustrated in Figures 6 and 7 it is contemplated to supply the rake head to the dealer with the brace rods 33 folded, in which condition the heads of the rakes may more readily be packed.

Except for the differences above outlined the structure of the embodiment illustrated in Figures 10 to 13 is substantially the same as that illustrated in Figures 6 to 9 in that the front or forward portion 31″ of the bridle 27′ is coupled with the saddle 20a, and the handle attached thereto, by springs 41′ corresponding to the springs 41. The free ends of these springs 41′ are attached to the portion 31″ of the bridle by screws, bolts or pins 43′ while intermediate their ends the springs 41′ curve slightly around the outer side of the saddle 20a and are secured to the saddle by a bolt or screw 45′ similar to the structure shown in Figure 7.

The yoke bar 26a has extending therethrough the long flat head bolt 37a, corresponding to the bolt 37, which extends outwardly through an aperture 20b formed in the saddle and leading from a socket 20c which is pressed in the saddle as shown in Figure 12. Thus the head of the bolt is pressed against the adjacent handle 47′ when the latter is secured in the saddle, in the manner illustrated.

The bolt 37a carries the two springs 39a and 40a, the first of which is interposed between the saddle 20a and the yoke while the second spring is interposed between the yoke and a nut 37b or other suitable holding means fixed to the outer end of the bolt 37a.

As shown in Figure 12, the rivet 53 will have its head countersunk in the inner side of the saddle member 20a so that the handle may lie flat in the saddle member.

Figures 15 to 19 illustrate another manner of coupling the rake handle with the head unit wherein the drilling of the rake handle for the passage of bolts therethrough and the socketing of the handle to receive the nuts and ends of other bolts is avoided. In this modified construction the handle receiving saddle member is generally designated 20d. This saddle member is of semi-cylindrical form and inwardly of its two ends it is completely cylindrical or circular but is divided so that the diameter of the saddle can be increased slightly to receive and frictionally hold the rake handle 47b. Adjacent to its forward end the circular split form of the saddle provides the two wing portions 60 while at the rear end such divided or split circular form provides the wing portions 61. As shown in dotted outline in Figure 18 the initial diameter of the part of the saddle where the portions 61 are found is materially less or smaller than that of the handle 47b so that when the handle is introduced forcibly into the saddle through the split circular portions such portions 61 will be sprung outwardly but will maintain a firm frictional grip on the handle.

The corresponding portions 60 at the forward end of the saddle are also initially forced together so that the saddle in this split circular portion will have a smaller diameter than the handle and in addition the forward adjacent corners a of the portions 60 curve inwardly slightly toward the longitudinal center of the saddle so that these points will bite into the handle after it is driven through the split circular or ring like portion, thus making it impossible for the handle to be withdrawn and to come out of position. At the same time the tight frictional engagement of the ring portions of the saddle will hold the handle against forward movement.

At the forward and rear ends of the saddle 20d the bottom portion of the saddle is provided with countersunk apertures 62 and 63 respectively to receive the head of bolt 64 and rivet 65, which parts secure, respectively, the spring 41b and the tie rods 52b.

Substantially midway of the ends of the saddle 20d the bottom of the saddle is pressed outwardly to provide the socket 66, through the center of which is an opening 67 for the reception of the shank of a bolt 37b, corresponding to the bolt 37 which passes through the yoke bar, not shown, but corresponding to the yoke bar 26, to maintain in position the inner and outer springs, not shown, corresponding to springs 39 and 40 shown in Figure 7.

The socket 66 is relatively deep so that the head of the bolt 37c will not contact the handle 47b and thus in the use of the rake, as the head moves, this bolt 37c will have free swinging movement.

It is possible to make the handle receiving saddle tubular throughout its length but it is preferred that it be formed only adjacent to its ends with the completely circular portions as this construction has the advantage of cutting down the total weight of the rake and at the same time a sufficient amount of open space is provided at the central part of the saddle and adjacent to the ends for the convenient formation of the countersunk apertures 62 and 63 and the apertured depression or socket 66.

It will be understood that in assembling the rake structure, where the handle receiving socket of the character shown in Figure 15 is employed, all of the connections will be made between the saddle 20d and the rake head, after which the end of the handle 47b will be placed in the saddle at the upper or back end and forced longitudinally through the split circular portions thereof whereupon the desired tight gripping of the handle by the coacting resilient portions 60 and 61 will be had.

In the present rake construction, in its several embodiments, it will be noted that the tines are connected with the yoke bar by having their upper ends engaged through circular openings. This construction is illustrated in detail in Figure 20 where a portion of a yoke bar is shown and generally designated 26b. The apertures in the yoke bar are designated 14b and one tine is shown engaged in an aperture, the same being designated 30b. It will be seen that the diameter of the hole 14b is only slightly greater than the width of the tine and accordingly when the bent or hooked end of the tine is engaged in the aperture and the yoke and bridle bars are moved together to be secured one to the other whereby the tines will be caused to spread apart or fan out, the tines, instead of being bent or sprung, will be free to swing freely about the center of the apertures in which they are engaged, as illustrated in broken lines. Thus the tines may be caused to assume their proper positions and after the rake head is completely set up the tines will be held firmly but they will not be twisted, bent or otherwise under strain.

I claim:

1. In a rake of the character described, a rake head comprising a substantially straight bridle bar having a longitudinal series of slots formed therethrough, a yoke bar of materially less width than the bridle bar in substantially the same plane and spaced therefrom, an arm formed integrally with each end of the bridle bar, said arms being directed toward said yoke bar in convergent relation and each arm having a rigid connection with said yoke bar, said yoke bar being substantially flat and having an arcuate row of substantially circular openings therein corresponding in number with the slots, the convex side of said arcuate row being directed away from said bridle bar, tines extending through the slots and each having a reversely extending rear end portion forming hook having a width corresponding to the diameter of and engaged in an opening of the yoke bar, and said hooks of the tines being in frictional gripping engagement with the yoke bar.

2. A rake structure of the character stated in claim 1, wherein the yoke bar has a flat face at each end forming an outwardly directed shoulder against which the adjacent arm bears, and said rigid connection comprising a terminal ear integral with each of said ends of the yoke bar and a slot in each arm through which the adjacent ear extends, each of said ears being secured to the adjacent arm against withdrawal from the arm slot and maintaining the arm against the adjacent shoulder.

3. A rake structure of the character stated in claim 1, including a relatively long plate member disposed across the bridle and yoke bars substantially midway of the ends thereof, a tongue formed at the rear end of the plate member and engaging across the rear edge of the yoke bar and against the underside to frictionally couple the plate member thereto, a tongue formed at the forward end of the plate member and directed downwardly across the forward side of the bridle bar and secured thereto, and a handle secured at one end longitudinally of and against said plate member.

4. A rake structure according to claim 1, with a handle, means securing an end of the handle to and across the yoke and bridle bars at points substantially midway between the ends of the latter bars, a brace rod connected to the rear end of each of said arms, the brace rods extending rearwardly in convergent relation and each being substantially parallel with the arm to which it is attached, and means securing the rear ends of the brace rods to the handle.

5. A rake structure according to claim 1, with a relatively long leaf spring disposed above and extending longitudinally of the bridle bar midway of its ends, means attaching the ends of the leaf spring to the bridle bar, said leaf spring having a downwardly curved portion formed substantially midway between its ends, a saddle plate of arcuate cross sectional form having one end resting in said curved portion of the leaf spring, the rear end of the saddle plate being disposed across the yoke bar, means securing the saddle plate to the leaf spring, a pin carried by the rear end of the saddle plate and passing downwardly through the yoke bar, springs encircling said pin above and below the yoke bar, the lower spring being secured between the lower end of the pin and the yoke bar, the upper spring being maintained between the yoke bar and the underside of said plate, a handle secured in the saddle plate, and bracing couplings between the handle and the rear ends of said arms.

6. A rake structure according to claim 1, with a handle supporting saddle of substantial length extending across the bridle and yoke bars longitudinally of the central part of the head structure, a leaf spring unit disposed lengthwise of the bridle bar between the same and the forward end of the saddle, means securing the leaf spring unit to the forward end of the saddle, a bolt attached at one end to the saddle and extending through the yoke bar, a pair of springs encircling said bolt with the yoke bar between the springs, one of the springs bearing at one end against the saddle and the other one of the springs being attached to the outer end of the bolt, brace rods connected between the side portions of the bridle bar and the rear end of the saddle, said bolt having a free swinging connection with the saddle, a handle disposed with an end in said saddle, and means frictionally securing the handle to the saddle.

7. A rake structure according to claim 6, wherein the said means frictionally securing the handle to the saddle, comprises pairs of arcuate members integral with the sides of the saddle and forming with the saddle a split annulus through which the end of the handle is extended, said annulus being initially of an inside diameter less than the outside diameter of the handle whereby a friction grip is set up between each annulus and the handle passing therethrough.

8. A rake structure according to claim 1, wherein said yoke bar has transverse end edges disposed in rearwardly converging relation and parallel with the adjacent arm, said arm slots being positioned a substantial distance inwardly of the rear ends of the arms, each of said arms lying flat against an end edge of the yoke for the said engagement of the adjacent ear in the slot thereof.

9. The invention according to claim 8, wherein each of said arms extends rearwardly beyond the yoke bar and has a transverse aperture therethrough, a brace member disposed across the rear of the yoke and having two ends each of which is positioned against the apertured rear extension of a side portion, and a fastening member extending through each aperture and securing the adjacent end of the brace member to the adjacent side portion.

10. The invention according to claim 8, wherein each of said arms has an angularly disposed terminal portion extending rearwardly beyond the yoke bar and substantially parallel to the longitudinal center of the rake head, a brace member disposed across the rear of the yoke and having two end portions in substantially parallel relation and each disposed against one of said terminal portions, and a securing element passing through and securing together an end portion and a terminal portion.

NORMAN E. BROOKE.

REFERENCES CITED

The following references are of record in the file of this patent:

UNITED STATES PATENTS

| Number | Name | Date |
|---|---|---|
| 500,848 | Breul | July 4, 1893 |
| 1,760,660 | Peterson | May 27, 1930 |
| 1,780,180 | Falstrom | Nov. 4, 1930 |
| 1,892,965 | Rocquin | Jan. 3, 1933 |
| 2,105,548 | Montan et al. | Jan. 18, 1938 |
| 2,205,827 | Brooke | June 25, 1940 |
| 2,304,147 | Brooke | Dec. 8, 1942 |